PHASING SYSTEM FOR MULTIPLE TRACK RECORDING

Original Filed May 9, 1955 3 Sheets-Sheet 1

INVENTOR
WAYNE R. JOHNSON
BY Lippincott + Smith
ATTORNEYS

PHASING SYSTEM FOR MULTIPLE TRACK RECORDING

Original Filed May 9, 1955

3 Sheets-Sheet 2

INVENTOR
WAYNE R. JOHNSON
BY Lippincott & Smith
ATTORNEYS

PHASING SYSTEM FOR MULTIPLE TRACK RECORDING

Original Filed May 9, 1955 3 Sheets-Sheet 3

INVENTOR
WAYNE R. JOHNSON
BY Lippincott & Smith
ATTORNEYS

United States Patent Office

Re. 25,809
Reissued June 22, 1965

25,809

PHASING SYSTEM FOR MULTIPLE TRACK RECORDING

Wayne R. Johnson, Los Angeles, Calif., assignor to Minnesota Mining and Manufacturing Company, St. Paul, Minn., a corporation of Delaware Original No. 2,828,478, dated Mar. 25, 1958, Ser. No. 610,436, Sept. 4, 1956, which is a continuation of Ser. No. 507,005, May 9, 1955. Application for reissue Dec. 15, 1958, Ser. No. 780,649
18 Claims. (Cl. 340—174.1)

Matter enclosed in heavy brackets [ ] appears in the original patent but forms no part of this reissue specification; matter printed in italics indicates the additions made by reissue.

This invention relates to means and methods for securing accurate phase relationships between signals which have been recorded as a number of parallel tracks on a single reproducing medium, this application being a continuation of copending application Serial No. 507,005, filed May 9, 1955, now abandoned. The invention is applicable to any type of recording system where accurate phase relationships are required between the signals reproduced from the various tracks, as, for example, in telemetering systems and the like, but its greatest utility at the present is in phasing recorded television signals in systems where the signals have been subdivided in frequency, by any of the various means that have been been proposed for this purpose, so that they may be reproduced from a medium traveling at moderate speeds.

Several such systems have been proposed. In order to transmit a television image which takes full advantage of the band width permitted under present standards of transmission in the United States, the frequency to be reproduced must, in theory at least, occupy a band between zero and 4 mc. per second. With any system now known of recording and reproducing electric impulses there is an upper limit to the frequencies which can be reproduced, which is set by the size of the sensing element of the reproducing head and the speed of translation of the recording medium. What the limit may be depends upon the type of recording used; at present the system which will reproduce the maximum amount of information per inch of track is magnetic recording; with some of the latest types of tape frequencies recorded at as high a rate as 9,000 cycles per inch can be reproduced. Even at this high rate of information (which most tapes will not carry reproducibly) about 37 feet of tape per second is required to carry the full channel. It is therefore clearly desirable to crowd as much information per inch on the tape as is possible.

As stated above, several methods have been devised for dividing the information required among several tracks and recombining it after pick-up to re-form the complete signal. To produce a good picture it is essential that the information recorded on the various tracks be phased with great accuracy. Taking 9,000 cycles per inch as the limiting frequency recorded, it will be seen that a misalinement of $1/18{,}000$ of an inch as between the recording and reproducing heads will result in a phase displacement of 180 degrees, or a complete reversal of sign of the frequency that it is desired to reproduce.

Permanent misalinements of heads as between different recording and reproducing apparatus may be compensated for by fixed adjustments and are therefore not too serious. What are very serious, however, are transient misalinements due to flutter and skew of the tape, the first being due to vibration of the tape as it passes from the guide roller to either the recording or the reproducing head. Skew may be due to the sides of the tape not being cut so that they are absolutely parallel, or to temporary or permanent misalinement of the feed. Both effects result in the heads producing the individual tracks engaging the various tracks in echelon instead of strictly in line, normal to the tape, with a consequent relative phase displacement in the reproduced signals.

Various methods, both mechanical and electrical, have been proposed for correcting this type of relative phase-displacement. The mechanical methods have not proved to be quick acting enough to correct flutter effects satisfactorily. The frequency of flutter is low in comparison with the frequencies which must be reproduced from a television signal, although it is normally within the audio range. Skew effects, although they may change from portion to portion of the tape, when they do change are likely to do so at very much slower rates. The electronic methods which have been devised, where they have proved to be successful, have required relatively large amounts of equipment and numerous tubes and have therefore proved expensive.

Tape drives have been improved so that as far as the speed of the tape itself is concerned, it can be held sufficiently constant for television purposes, as can cyclic variations in the speed of the tape as a whole, which produces frequency modulation of the type known as "wow." It can therefore be assumed that these causes of difficulty are adequately taken care of. The objects of this invention, therefore, are to provide a means and method of compensating for phase variation between signals which are recorded as parallel tracks on a moving medium, which phase variations are due to either flutter or skew of the medium; to provide means for correcting phase variations of the type described which will also correct those due to misalinement or differences in alinement between recording and reproducing heads; to provide apparatus for accomplishing the above results which is relatively simple and which can be made of very high accuracy; to provide a means and method which can be utilized with signals of almost any character; to provide apparatus for correcting phase displacements between signals recorded on parallel tracks which will not "lock" in an undesired phase relationship; and to provide methods and apparatus of the character described which are particularly adapted to phasing television signals.

In accordance with the broad concept of the present invention, a cyclically repeating reference signal, of different character from the message signals between which phasing is desired, is recorded simultaneously on each track, so that it will be reproduced in each channel of the pick-up mechanism. The reproduced signals in each channel are fed into individual delay-lines wherein the delay is adjustable by varying an electrical bias applied thereto. Since, in such delay-lines, the characteristic impedance varies with the amount of delay introduced, each line is terminated in an impedance which also may be varied by applying an electrical bias. The lines in each channel are fed from amplifiers, the output impedances whereof are very low in comparison with the characteristic impedance of the lines, so that the system is of the "constant voltage" type. The output circuits for each channel are taken off between the output terminals of the delay-lines and their terminating impedances, the lines preferably feeding into amplifiers whose impedance is high in comparison to that of the lines, so that the impedance into which the delay-lines feed is determined primarily by the bias-varied impedance. One of the channels, which may be referred to as the "master channel," supplies a feed-back loop which includes a phase-discriminator to develop an error signal, the magnitude and sign whereof depend upon the phase relationship between the reference signal supplied from the delay-line and a comparison signal. The error signal developed by the phase discriminator is applied to control the frequency of an oscillator whose nominal or average frequency is integrally related to that of the reference signal, being either that of the signal itself or an integral multiple thereof, and whose instantaneous frequency can be varied by a bias applied from the integrated error signal, the time constant of the integrating circuit being relatively long as compared to the flutter frequencies. A signal of reference frequency, derived from this oscillator, is also supplied to the phase discriminator as the comparison frequency; for certain types of reference signal this may be a sine wave, but preferably it is a short pulse recurring at the reference frequency, in order to maintain greatest accuracy of discrimination.

The output of the delay-line in each channel, including the master channel, includes a second type of feedback loop. Each of these loops includes a phase discriminator which may be of the same type as that already mentioned in connection with the master channel, and each of the latter phase discriminators is fed with the same comparison frequency signal or pulse developed from the oscillator controlled by the master channel. The error signals from each of the individual channel discriminators are integrated in a circuit of short time constant in comparison with the highest expected flutter frequency, to develop a bias which is applied to both the individual delay-line involved and its associated terminating impedance in such sense or polarity as to increase the delay of the line and so retard the phase of the reference signal if the latter leads the comparison signal and to decrease the delay of the line if the reference signal in the controlled channel lags the comparison signal. Simultaneously the impedance of the termination to the delay-line is varied to match that of the delay-line and prevent reflections of any material magnitude therein. As employed for telemetering or like service the reference frequency signal may be merely a sine wave which differs clearly in frequency from the message signals which are to be phased. In connection with television signals, where the frequencies to be reproduced may be any within the total range which the individual channels can handle, the reference signal is preferably introduced into the blanking interval, which follows each line of the signal transmitted, and is in the form of a step function; i.e., a signal which rises, as steeply as possible, from the black level to the white level. Combined with a sharp pulse comparison developed from the frequency of the controlled oscillator in the maser feedback loop this leads to the most accurate type of discrimination.

All of the above will be more readily understood from the detailed description of certain preferred embodiments of the invention which follows, taken in connection with the accompanying drawings wherein.

Figure 1:
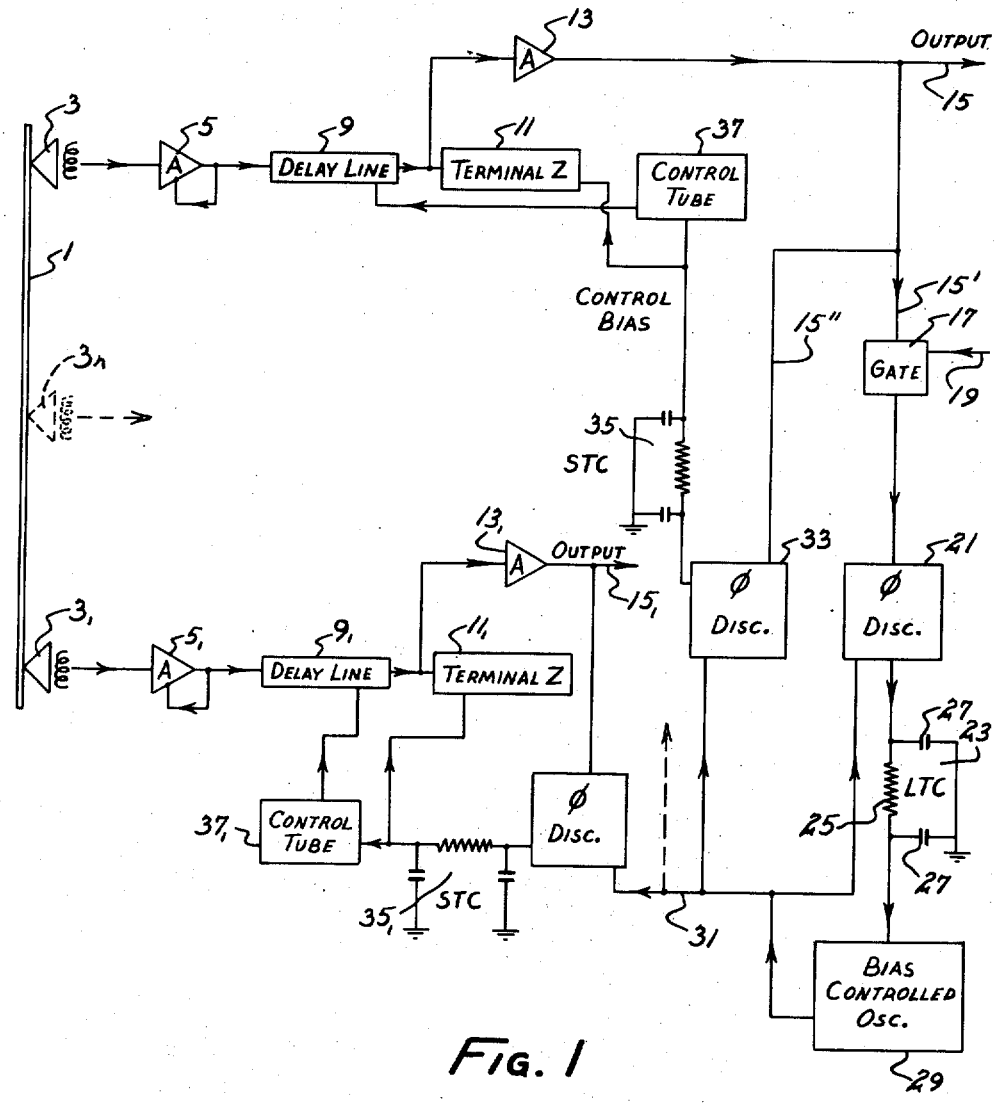
FIG. 1 is a block diagram illustrating the broad elements of the apparatus as used with any general type of reference signal.

In the diagram of FIG. 1 the reference character 1 indicates in cross-section, a magnetic tape or other form of recording medium. Assuming that a magnetic tape is used, it is driven by conventional means, not shown, past a plurality of reproducing heads of which two are shown, head 3, which is connected to the master channel, and $3_1$, symbolic of a plurality of slave heads. Any number of additional heads may be used, such additional heads being indicated symbolically by that shown in dotted outline and indicated as $3_n$. Since all channels except the master channel are identical, only the channel supplied by the head 3 and one "slave" channel head $3_1$ are shown. Much of the equipment in the two types of channels is the same and parts in the slave channel which are duplicates of those in the master channel are identified by the same reference characters as those used to identify the master channel equipment, the parts used in the slave channel being distinguished, however, by the subscript 1 throughout.

All of the pick-up heads 3 may be of identical character and may be of any known type, the nature of the invention not being dependent upon the type of pick-up or reproducer head used.

The signals from the pick-up heads 3 are supplied, usually, through one or more preamplifier stages, to preamplifier 5, the output stages of which are stages of high gain with 100% feedback, so that the effective gain in these stages is substantially unity while the effective output impedance of the amplifier approaches zero. With such an arrangement, up to the overload limits of the output tube, the output voltage is substantially independent of the impedance into which the amplifier is working. This impedance comprises a delay line 9, both the delay and the impedance of which are variable by the application of an electrical bias, and the delay line is terminated by a terminal impedance 11, the value of which can also be varied by an applied bias so as to match the impedance of the line and minimize any reflections from the output back toward the input of the line. The output signal from the line is taken off between the delay line and its terminal impedance and in this case comprises an amplifier 13, the input impedance of which is high in comparison with the maximum value of the impedance 11, so that it has substantially no effect upon the load into which the delay line is working.

The output of the amplifier 13 connects to a line 15 which leads to the utilization circuit of the apparatus, whatever this may be. Taking off from the line 15 are two branch circuits, designated as 15' and 15''. Branch circuit 15' connects to apparatus which is peculiar to the master channel, whereas the equipment supplied by branch circuit 15'' is duplicated in all channels, and will be described hereinafter.

As shown in the figure, the first element supplied by the line 15' is a gate 17. This particular equipment may or may not be required; if the reference signal is continuous and differentiated from the other signals by frequency the gate would not be necessary. In case the reference signal is distinguished on a time basis from the other signals in the channel the gate is used to complete the circuit at the proper epoch so as to prevent the apparatus from locking in on some adventitious signal which may have the wrong epoch of the recorded signal. The use of the gating circuit will be described more particularly in connection with the specific form of the invention used in connection with television. If a gating signal is used it is supplied from an external source through lead 19.

The signals from the line 15', supplied either directly or through the gate 17 if the latter is used, form one source of supply to a phase discriminator 21. This discriminator may take any of several forms. Sometimes termed "phase sensitive detector" the purpose of this device is to develop a signal which depends in polarity and magnitude on the relative phase of the signal supplied from the lead 15' and a comparison signal. In effect it is a switch which is closed by the comparison signal; if the switch is closed as the reference signal passes through zero no output signal is developed, whereas if the switch closes either before or after the epoch when the reference signal is passing through zero an output signal is developed, the magnitude of which depends upon the amount by which the reference signal is out of phase with the comparison signal. Double-balanced modulators, biased diodes, or multi-electrode tubes may be used as such discriminator gates, many forms being well known.

The error signal from the discriminator 21 is integrated by what is essentially a low-pass filter circuit 23, comprising a series resistor 25 with shunt capacitors 27 connected to its input and output ends. This circuit is given a relatively long time constant in comparison with the minimum frequency of flutter so that the error signal, as developed at the output of the integrating circuit, is averaged over many cycles of the reference signal, and recurrent changes of phase such as are due to flutter are cancelled out.

The error signal thus developed is applied to a bias-controlled oscillator 29. Any of the known oscillators whose frequency can be so controlled may be used, the most usual of such circuits being either reactance-tube-controlled sine-wave oscillators, or multivibrators whose frequency of operation depends upon their bias or supply voltages. Oscillator 29 develops normally either the frequency of the reference signal or an integral multiple thereof, from which a signal of reference frequency is derived. This latter signal is the comparison signal which is fed to a comparison bus 31, one branch lead from which supplies the comparison signal to the discriminator 21. As a result of this arrangement the bias-controlled oscillator 29 supplies to the control bus 31 a frequency which may vary as the average frequency of the reference signal varies, but which disregards short term variations in frequency such as are due to flutter.

The second feedback loop is supplied through the lead 15'', and as has been stated, this loop is duplicated in the other channels as well as in the master channel. The loop includes a phase discriminator 33 which may be identical in construction with the phase discriminator 21, and which receives its comparison signal from the bus 31. Like discriminator 21 the output of discriminator 33 is an error signal. This latter error signal is fed to an integrating network 35 which may be of the same general character as in the integrating circuit 23 but which has a very much shorter time constant; i.e., a time constant which is short in comparison with the period of the maximum flutter frequency which is to be expected. The integrated error signal is applied to a control tube 37, to vary the delay of the line 9 and is also applied directly to the terminal impedance 11 to maintain its value substantially equal to that of the characteristic impedance of the delay-line 9 as that impedance varies with varying delay. As will be shown, the control tube may also function as the terminating impedance, but as this is not necessarily the case the two devices are indicated separately.

Figure 2:
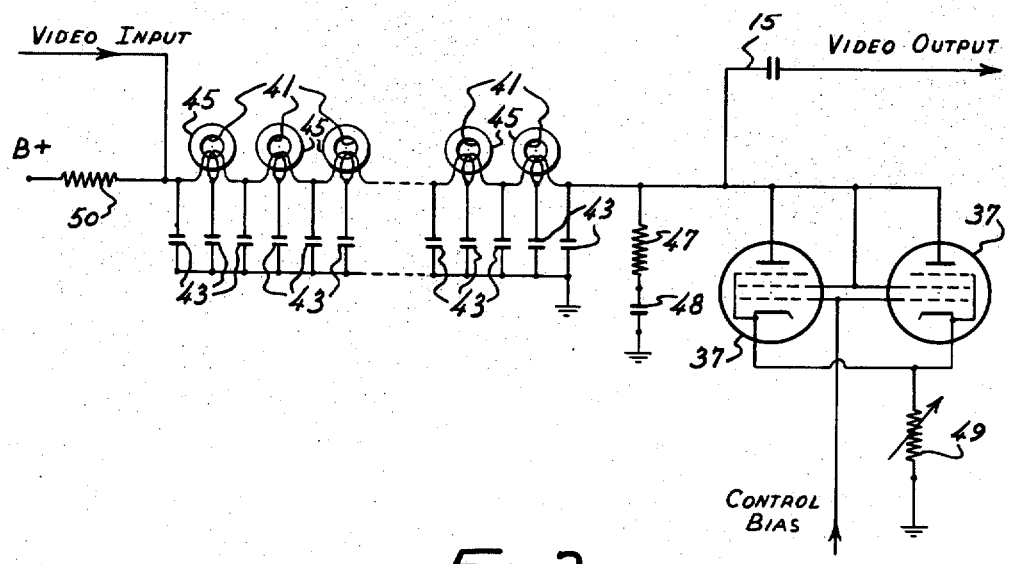
FIG. 2 is a schematic diagram of a delay-line which is variable by means of an electromagnetically applied bias, together with a terminal impedance which is variable by the same bias.
Figure 3:
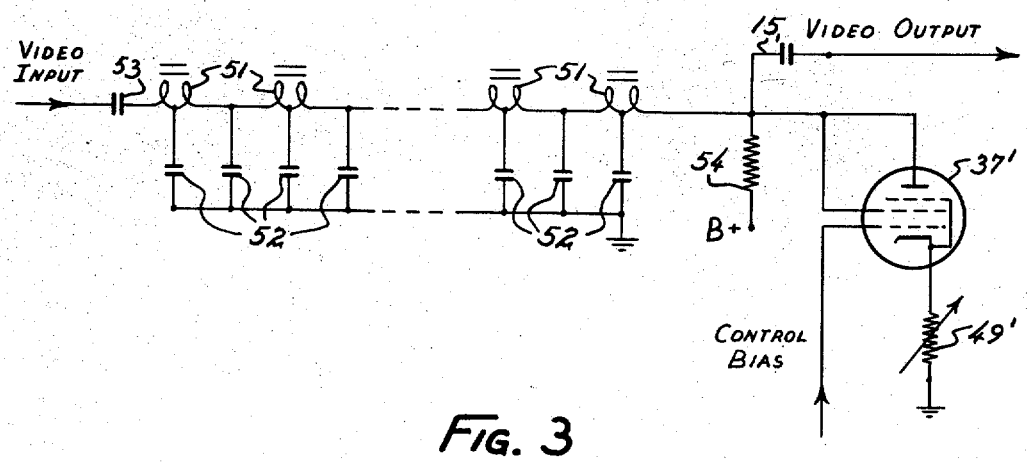
FIG. 3 is a schematic diagram of a delay line which is variable through the application of a voltage bias.

FIGS. 2 and 3 show two different forms of bias-varied delay lines and terminal impedances which will accomplish this result. In the form illustrated in FIG. 2 the delay line comprises a network of series inductive elements 41 and shunt capacitive elements 43. Each inductive element comprises a toriodal core 45, preferably of ferrite or other high-resistance, low-loss material having ferromagnetic properties. Being ferromagnetic, the effective permeability of these cores varies with their degree of magnetic saturation. In one line that has been constructed toroids ⅜ inch O.D. by ⅛ inch I.D. are used, each toroid having a 20 turn, center tapped winding. This line has a maximum characteristic impedance of approximately 1000 ohms and a 20 section line has a maximum delay of about 2.5 imicroseconds.

The delay line is terminated by a resistor 47, which matches the maximum impedance of the line, i.e., about 1000 ohms. This resistor connects to ground through a blocking condenser 48. The control tube or tubes 37 are connected with their plate circuits in parallel with the resistor. In this case the control tubes operate both to vary the saturation of the cores 45 and to form the variable portion of the terminating impedance of the line. In the line illustrated two 6L6, beam-power tubes, triode connected, are used in parallel for this dual purpose. Their plates and cathodes are both connected together, the cathodes being grounded through a variable resistor 49.

The control bias or error signal developed by the discriminator 53 is applied to the grids of the tubes 37 in such sense that if the reference signal lags the comparison signal from oscillator 29 the grids swing positive, increasing the plate current of the two tubes. The plate current is supplied from a regulated source at B+ through a relatively small resistor 50, and increase in the plate current therefore tends to saturate the cores 45, decreasing their apparent inductance and hence the delay of the line, so that the lagging reference signal is effectively speeded up and brought into coincidence with the comparison signal. At the same time the video input is connected between the resistor 50 and the input of the delay line.

The effective plate resistance of the tubes 37 varies inversely with their plate current, as indicated by the decrease in the slope of the plate characteristic curves of these tubes with increasing negative bias. The effective impedance of these tubes in parallel with the resistor 47 therefore varies in the same sense as the effective impedance of the line with the decreasing inductance due to increased saturation. The amount of impedance variation with a given variation in control bias can be adjusted by means of the variable resistor 49, which provides a current feedback of variable amount. Variation of this resistor therefore provides an easy method of obtaining a substantially exact match between the characteristic impedance of the line and its terminating impedance.

FIG. 3 shows a different form of bias-varied delay line. In this case the elements of the line comprise fixed, center-taped series inductors 51 and small ceramic condensers 52, bridged across the line, as the shunt elements. These condensers are of the "ferro-electric" type, their effective capacity varying as an inverse function of the voltage applied across them. An increase in this voltage therefore serves to decrease the delay of the line and to increase its effective impedance.

The control bias is adjusted by the control tube 37', which, in this case too, acts as a portion of the terminating impedance. The video signal is applied to the line through a blocking condenser 53. The fixed portion of the terminating impedance is a resistor 54 which acts as the anode resistor through which space current is supplied to the control tube 37', the latter being connected in the same manner as was described for the tube 37 in the delay line illustrated in FIG. 2. The error voltage from the discriminator 33 is supplied to the grid of the tube 37' in such sense that if the reference signal lags the grid tends to swing positive, thus being the reverse polarity from that used with the form of line shown in FIG. 2.

The bias potential applied across condensers 52 varies with the drop across the plate resistor 54. If the error voltage applied to the grid of tube 37 were to swing so strongly negative as to cause the tube to cut off, the full voltage of the plate supply would be applied across the shunt condensers, reducing their capacity to its minimum value and therefore giving the line its minimum delay and maximum impedance, while a swing of the grid toward the positive drops the bias on the condensers, increases their capacity and hence the delay. The plate impedance of tube 37 varies in the same sense as the impedance of the line, as in the case of the type of line shown in FIG. 2. Adjustment of tube impedance to match line impedance is accomplished by varying the cathode resistor 49' as in the case of the line and its terminal impedance first described.

The line of FIG. 3 has the theoretical advantage over that illustrated in FIG. 2 in that it is more efficient in its use of input power, since its input circuit is not shunted by the resistor 50. It is therefore quite probable that eventually the type of line using nonlinear condensers may supersede that using nonlinear inductors. At the present time, however, the nonlinear condensers are not as uniform as are the ferrite inductor cores and therefore to construct the type of lines shown in FIG. 3 requires the selection of the condensers which are to be used from so many samples that the use of the variable inductor type is now more economical and therefore to be preferred.

The operation of the overall system should now be apparent. Considering first the feedback loop fed by the lead 15', the reference signal, either continuous or discontinuous pulses passed by the gate 17, is supplied to the discriminator 21 which develops a bias to control the oscillator 29. Owing to the long time constant of the integrating circuit 23 the control bias supplied to the oscillator can change only very slowly, and the frequency developed by it will therefore remain substantially constant at the average frequency of the reference signal. There are known methods of controlling the speed of the tape drive to make this average value that which is desired, and accordingly the frequency supplied to the control bus 31 can be made as exact as necessary.

The same reference signal is fed to the discriminator 33 together with the mean-frequency comparison signal from the controlled oscillator 29. As a result of flutter, the reference signal may instantaneously either lead or lag the comparison signal, and the discriminator 33 develops an error signal which depends in polarity and magnitude on the discrepancy between the two signals. Owing to the short time constant of the integrating circuit 35, the bias voltage imposed upon the control tube 17 and terminal impedance 11 can vary at the rate of any flutter. If, due to flutter, the reference signal is instantaneously leading—i.e., if its frequency is greater than the average—the bias is applied to the delay line in such sense as to increase the delay, whereas if the frequency is instantaneously less than average the bias of the delay line is so applied as to decrease the delay. As in the case of any feedback loop the result is to decrease the variation in inverse proportion to the effective amplification round the loop, and the control can be made as rigid as desired.

It will be noted that the control exercised upon the delay line is such that the frequency fed to the discriminator 21 from the output line is maintained almost exactly at the average frequency and the duty upon this discriminator is relatively low. It therefore supplies a substantially constant bias to the oscillator 29 and the variations which have to be smoothed out by the circuit 23 are relatively small. It is the discriminator 33 which therefore exercises the greater portion of control, and this circuit can be made as "stiff" as may be desired, reducing phase variations of relatively large magnitude to negligible value.

The slave circuits of the other channels typified by the channel controlled by the discriminator $33_1$, operate in the same fashion with regard to flutter as those in the master channel, but they also serve to correct for skew, imposing a constant bias on the fluctuating bias due to flutter. The delay of the line $9_1$ is therefore controlled so that any lead or lag which may result from skew and flutter acting together are compensated and the signals applied to the amplifiers 13 and $13_1$ are in phase to be combined or compared without uncertainty as to their relative values.

Figure 4:
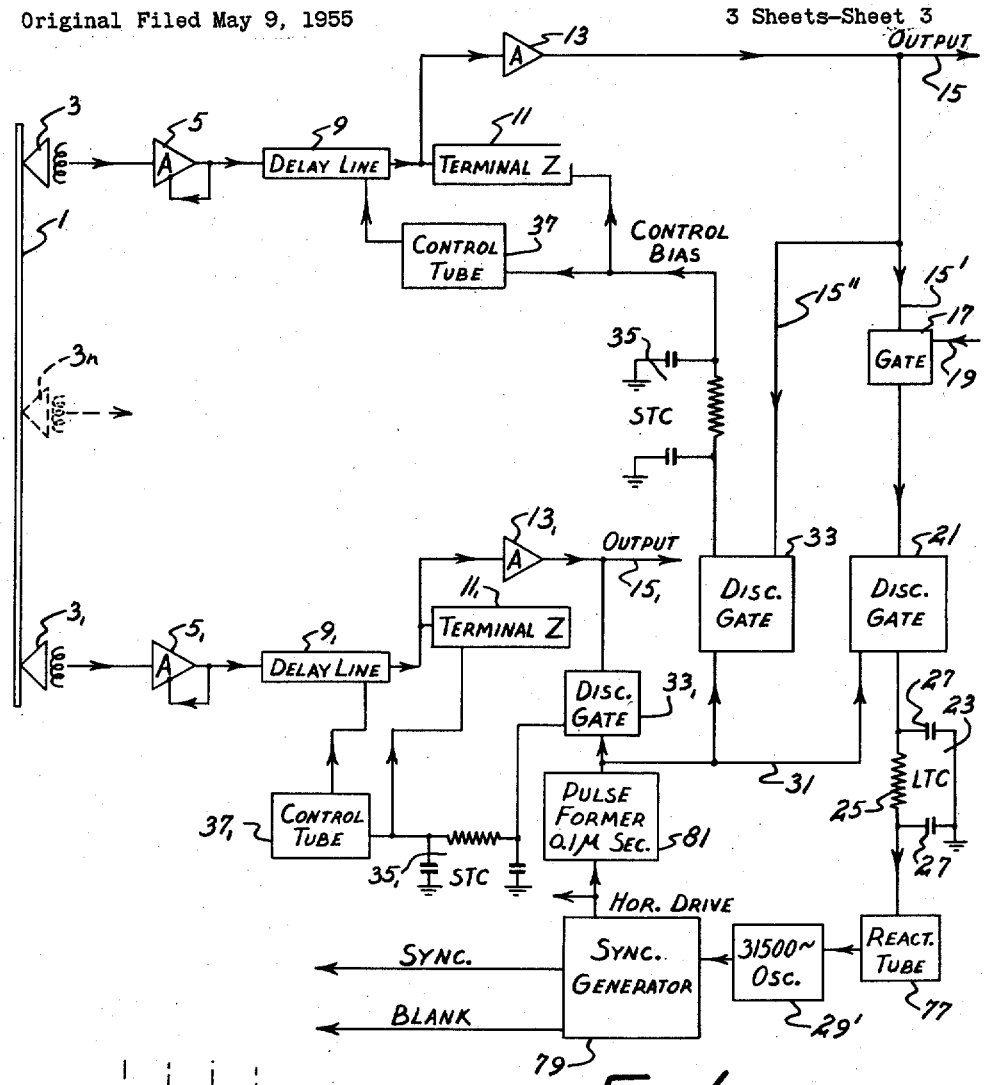
FIG. 4 is a block diagram of the invention as applied specifically to the phasing of television signals.
Figure 5:
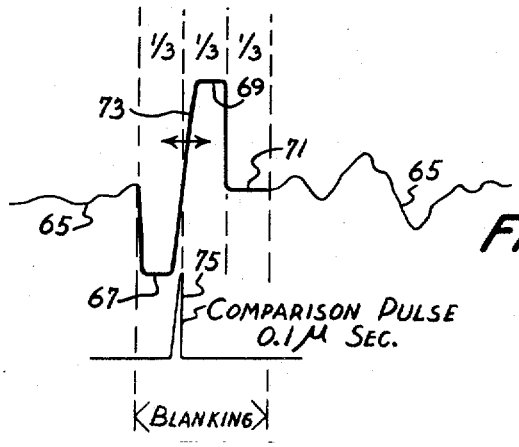
FIG. 5 is a diagram showing the waveforms of the reference and comparison signals as introduced into the blanking interval of a television signal for use in connection with the equipment illustrated in FIG. 4.

FIG. 4 shows the modifications of the apparatus disclosed in FIG. 1 as specifically applied in television recording. Except for certain details in the feedback loops the equipment is substantially identical with that shown in FIG. 1 and corresponding parts are designated by the same reference characters and will not again be described. For this particular application of the invention a reference signal having a waveform such as is illustrated in FIG. 5 is injected into the recorded signal during the blanking interval. In the waveform shown, the picture signal itself is indicated by the portions of the curves designated by the reference character 65. At the instant of blanking this signal drops to the "black level," as illustrated by a portion of the curve identified by the reference character 67. In the waveform actually used in practice this portion of the curve occupies approximately one-third of the blanking interval. For the next third of the blanking interval the signal rises, as rapidly as can be reproduced from the tape, to the white level at 69, the white level intensity being chosen so that the difference between the intensities recorded at 67 and 69 are equal to the dynamic range of the recording medium. For the final third of the blanking interval the signal level drops to the mean level or "A.C. axis" of the picture signal, as shown at 71, although this is unimportant for the purpose of the present invention.

In accordance with present standards of television transmission the interline blanking interval is a little less than 9 microseconds, and the space occupied by the portion of the waveform which includes the black and white levels is approximately 5 microseconds. A gating pulse of approximately 3 microseconds is applied to the gate 17 through the lead 19. This gating pulse can be derived, for example, from the circuits already mentioned which are used to maintain the tape drive at constant average value so as to give the proper frequency output. Such circuits are described elsewhere and the manner of generation of the gating pulses does not concern this invention, it being sufficient to note that the circuit to the discriminator is completed only during the epochs of about 3 microseconds during which the reference pulses occur.

The steep rise 73 of the reference wave therefore occurs sometime within this 3 microsecond interval, but the position of the rise within the gate can vary, forward or back within the gate, as indicated by the double-headed arrow crossing the curve.

It is therefore the portion of the wave which includes more or less of the portions 67, 73 and 69 which are supplied to the discriminator 21. This discriminator can be any of the forms that have been mentioned in connection with FIG. 1. The preferred form is a simple electronic switch, which closes, to complete the circuit, when a control pulse is applied. As far as the operation of the apparatus is concerned, this switch can be itself a gate similar to the gate 17, or it can be a double-balanced ring modulator. It is controlled by a very short, unidirectional pulse, developed as will be described below. Such a pulse is illustrated at the reference character 75, immediately below the reference wave form. It will be apparent that the waveform developed by the discriminator will also be a pulse, of equal length to the pulse 75, but that its polarity and magnitude will depend upon the position of the control pulse with reference to the rise of the reference pulse. If it occurs at the interval when the wave 73 has risen to exactly half of the white level no net voltage will be passed by the gate, the voltage of the reference waves being negative during one half of the time when the circuit is completed and positive the other half of the time. It will be seen as the rise varies between the positions indicated by the arrow on the waveform, the voltage passed by the gate will vary very rapidly between extreme negative and extreme positive values. This particular type of reference wave therefore gives maximum sensitivity of control.

The pulses of error-voltage are integrated by the circuit 23 as has already been described in connection with FIG. 1 and this error-voltage, converted to a constant D.C. value, is applied to a reactance tube 77 bridged across the oscillating circuit of an oscillator 29' in accordance with well known practice.

Oscillator 29' is preferably designated to operate at a nominal frequency of 31,500 cycles, or twice the line frequency of a standard television signal. The exact frequency at which it operates is, of course, controlled by the reactance tube.

The oscillator 29' drives a standard sync generator 79, the oscillator 29' being either that normally included within such a generator or an external oscillator substituted therefor. Such generators are normally supplied with an oscillator which operates at double the line frequency, this being the frequency of the so-called equalizing pulses of the standard television waveform and the least common multiple of the line and frame frequencies in a two-to-one interlaced television raster. From this frequency there are derived the various signals required for synchronizing a television picture, its various outputs being symbolized by the lines designated as "Sync," "Blank," and "Hor Drive." The pulses developed and supplied to these output lines are applied to supply the waveforms for the television signal to be transmitted. The horizontal drive signal occurs at the line frequency of 15,750 kc., and this is fed to a pulse-former 81, which derives therefrom a 1/10 microsecond pulse. This is the pulse illustrated at 75 of FIG. 5. It is fed to the control bus 31 to operate all of the phase discriminators, and it may be derived by a simple differentiating circuit from the standard horizontal drive pulse, or from a monostable multivibrator.

Discriminators 33 and $33_1$ may be of any type suitable for the discriminator 21, as has previously been stated in connection with FIG. 1. The reference signal in each channel is of the form illustrated in FIG. 5, so that the control is equally accurate in all channels. The error signals from the discriminators are integrated in the circuits 35 and $35_1$ and are applied to control the delay line and its terminating impedance as has already been described.

In theory there is no difference whatsoever between the apparatus illustrated in FIG. 1 and that show in FIG. 4. The advantage of that shown in the latter figure is that it employs, for developing its control signal, equipment that would be required in any event to synchronize the transmitter and, particularly, in that the waveforms used for the reference signal lend themselves particularly to great accuracy of control. Signals developed in the various channels can readily be held to within less than 1/20 of a microsecond of exact phase. This is sufficient to give sharp outlines and good definition of the reproduced picture.

One advantage of the apparatus is that with the exception of the bias-varied delay lines the components are all those which are available in numerous forms for use in television and radar equipment and are familiar to all of those skilled in the art. It should be noted that the choice of the channel from which the master reference signal is derived is entirely arbitrary, and that while it is generally desirable in the reproduction of television signals that the master channel be one carrying picture information, even this is not necessary as long as comparison signal of constant frequency can be developed from which the phasing information can be derived. For example, in the production of color television pictures it is necessary to transmit phasing information for the color sub-carrier, which is transmitted as "bursts" during the inter-line blanking intervals. Accompanying sound must also usually be transmitted together with the picture. The recurrent bursts have a repetition frequency which is the same as the line frequency of the picture and they can be recorded, amplitude modulated on a frequency-modulated sound-track without interfering with the sound. The recurrent bursts can therefore be used as the reference signal for controlling the oscillator which generates the master signal, instead of taking the reference signal for this purpose from one of the picture tracks. Alternatively, the bursts can be employed to generate the signal which actuates the gate 17, since if they are imposed on a sound track they are of entirely different character from the sound signal and there is no danger of confusion and an accidental locking of the phasing on the wrong signal.

It will therefore be appreciated that there are numerous modifications of the invention which are available to the designer of apparatus of the character here contemplated, and the particular embodiments here described are intended to be illustrative of the invention rather than limiting its scope, all intended limitations being specifically set forth in the following claims.

I claim:

1. In apparatus for reproducing in a number of channels signals recorded as a plurality of parallel tracks on a single recording medium, each of said signals including a common cyclically recurring reference signal simultaneously recorded on all of said tracks: means for phasing and synchronizing the reproduced signals to eliminate the effects of flutter of the recording medium and misalinement of reproducing heads with respect to said tracks comprising: a master oscillator tuned to operate at a mean frequency integrally related to the frequency of said reference frequency and variable from said mean frequency in response to a control voltage, means for developing from said oscillator frequency a train of signals recurring at substantially said reference frequency, a delay-line in each of said channels which is variable in delay in response to an electrical bias applied thereto, a terminating impedance for said delay line also variable in response to an electrical bias, a feedback loop connected to the output of the delay-line in one only of said channels and comprising a discriminator responsive to said reference signal and connected to compare the time relation of said reference signal to said train of signals to develop an error signal dependent in sign and magnitude on the relative timing of the compared signals, and an integrating circuit of relatively long time-constant connected to apply the average value of said error signal as a control voltage to said oscillator; a plurality of additional feedback loops connected respectively to the outputs of the delay lines in each of said channels including said one channel and each including a discriminator connected to compare the time relation of said reference signal and said train of signals to develop an error signal dependent in sign and magnitude on the relative timing of the signals compared thereby, and a circuit of relatively short time-constant for integrating said last-mentioned error signal and connected to provide said electrical bias to said delay-line and said terminating impedance in such sense as to vary the delay in the connected delay-line to correct errors in time relationship.

2. The combination defined in claim 1 wherein said terminating impedances each comprise a vacuum tube having a cathode, an anode and a control electrode, said cathode and anode being connected across said delay-line, and a source of space current connected between said cathode and anode, said short time-constant integrating circuit being connected to said integrating circuit to vary the effective impedance of said vacuum tube by varying the space current thereof.

3. The combination as defined in claim 2 including connections from said source of space current to said vacuum tube through said delay-line whereby variations in space current vary the bias applied to said delay line.

4. The combinations as defined in claim 1 wherein each of said delay line has inductance provided by a plurality of turns of wire on a core of ferro-magnetic material, and including means for applying an electro-magnetic bias to vary said inductance comprising a vacuum tube having a cathode, an anode and a control electrode, a source of space current for said tube, and a circuit connecting said anode and cathode and electro-magnetically linked with said core to vary the saturation thereof, said short time-constant integrating circuit being connected to the control circuit of said tube to cause variations in said space current.

5. The combination defined in claim 1 wherein said delay line has shunt capacity effective across a medium the dielectric constant whereof varies with variation of voltage thereacross, and including means for varying said shunt capacity comprising a vacuum tube having a cathode, an anode and a control electrode, a source of space current for said tube, a resistor connected in circuit with said source, said cathode and said anode, and connections for applying voltage from said source through said resistor across said capacity, said short time-constant integrating circuit being connected to said control electrode to vary the space current through said tube and thereby vary the voltage across said shunt capacity.

6. In apparatus for reproducing in a number of channeys signals recorded as a plurality of parallel tracks on a single recording medium, each of said signals including common cyclically recurring reference pulses simultaneously recorded on all of said tracks: means for phasing and synchronizing the reproduced signals to eliminate the effects of flutter of the recording medium and misalinement of reproducing heads with respect to said tracks comprising: a master oscillator tuned to operate at a mean frequency integrally related to the frequency of said reference frequency and variable from said mean frequency in response to a control voltage, means for developing from said oscillator frequency a train of pulses recurring at substantially said reference frequency, a delay line in each of said channels variable in delay in response to an electrical bias applied thereto, a terminating impedance for said delay line also variable in response to said electrical bias, a feedback loop connected to the output of the delay line in one only of said channels comprising a discriminator responsive to said reference signal and connected to compare the time relation of said reference pulses to said train of pulses to develop an error signal dependent in sign and magnitude on the relative timing of the compared signals, and an integrating circuit of relatively long time constant connected to apply the average value of said error signal as a control voltage to said oscillator; a plurality of additional feedback loops connected respectively to the outputs of the delay lines in each of said channels including said one channel and each including a discriminator connected to compare the time relation of said reference pulses and said train of pulses to develop an error signal dependent in sign and magnitude on the relative timing of the signals compared thereby, a circuit of relatively short time-constant for integrating said last-mentioned error signal connected to provide said electrical bias to said delay line and said terminating impedance, and a gating circuit in said first-mentioned feedback loop operative in response to a separately generated train of pulses recurring at the desired frequency of said reference pulses to complete said last-mentioned feedback loop only at the epochs of recurrence of said reference pulses, thereby to ensure stabilizing said apparatus on said reference pulses to the exclusion of other possible signals of like character which might be included in the reproduced signals.

7. In apparatus for reproducing in a number of channels signals recorded as a plurality of parallel tracks on a single recording medium, each of said signals including a common cyclically recurring reference signal simultaneously recorded on all of said tracks, means for accurately phasing and synchronizing the reproduced signals to eliminate the effects of flutter of the recording medium and misalinement of reproducing heads with respect to said tracks comprising: a plurality of variable delay-lines connected respectively in each of said channels, means for developing from the reference signal from the output of the delay-line in one of said channels a constant comparison frequency equal to the average repetition frequency of said reference signal, means in each of said channels for comparing the phase of the reference frequency therein wtih that of said comparison frequency and developing therefrom an error signal corresponding to the difference in phase therebetween and means connected in each channel and responsive to the error signal developed therein for varying the delay of the corresponding delay-line to bring the phases of the reference signals from the output circuits of the respective delay-lines into coincidence with the phase of said reference signal in the output of the delay-line in said one channel.

[8. In apparatus for reproducing in at least two channels signals recorded as parallel tracks on a single recording medium, each of said recorded signals including simultaneously recorded cyclically recurring reference signals of constant repetition frequency, means for maintaining the reproduced reference signals simultaneous to eliminate the effects of flutter of the reproducing medium and relative misalinement of reproducer heads comprising a delay-line connected in each of said channels, at least one of said delay-lines being adapted to introduce a delay in signals transmitted therethrough which is variable in response to a control signal, means connected to receive signals from at least one of said delay-lines for selecting the reference signal therefrom, a discriminator connected to both of said delay-lines for comparing the time sequence of said reference signals therein and develop an error signal dependent in sign and magnitude upon the direction and magnitude of departures from simultaneity therein, and connections for applying said error signal as a control voltage to the variable delay-line in such sense as to bring said reference signals into coincidence.]

[9. In apparatus for reproducing recorded signals including a cyclically recurring reference signal recorded at constant frequency, means for maintaining a constant time relationship between the reproduced reference signal and a comparison signal of like frequence to eliminate effects of flutter of the reproducing medium, comprising a delay-line connected to receive the reproduced signals and variable in delay characteristic in response to a control signal, a discriminator connected to receive said comparison signal and signals from said delay-line and to develop an error signal corresponding in sign and magnitude to the difference in time between said reference signal and said comparison signal, and means for applying said error signal as a control signal to vary the delay of said delay-line in such sense as to reduce said time difference.]

10. In apparatus for reproducing recorded signals including a cyclically recurring reference signal recorded a constant repetition frequency means for maintaining a constant time relationship between the reproduced reference signal and a comparison signal of like frequence to eliminate effects of flutter of the reproducing medium, comprising a delay-line connected to receive the reproduced signals and variable in delay and impedance characteristics in response to a control signal, impedance means terminating said delay-line and variable in value in response to a control signal, a discriminator connected to receive said comparison signal and signals from said delay-line to develop an error signal corresponding in sign and magnitude to the difference in time between said reference signal and said comparison signal, and means for applying said error signal to said delay-line and to said variable impedance means as control signals to vary the delay introduced by said delay-line in such sense as to reduce said time difference and to match said impedance means to the characteristic impedance of said delay-line.

*11. In combination for use in apparatus including transducing means for reproducing signals recorded in a plurality of tracks on a medium continuously movable in a direction parallel to the tracks, means for phasing and synchronizing the reproduced signals by a variable delay in the passage of such signals to eliminate the effects of flutter in the movement of the medium and the effects of misalignment of the transducing means with respect to the track, including, means for providing a control signal having variable characteristics, means including a current-control member coupled to the control signal means and responsive to the control signal for providing*

*a first impedance variable with variations in the characteristics of the control signal, means including a line having first and second ends and coupled electrically at one end to the current-control member and operatively coupled at the other end to the transducing means to provide a second impedance variable with the variations in the first impedance from the current-control member to provide a match between the first and second impedances and to delay the passage of the reproduced signals by an amount variable with the variations in the second impedance, and means including control stages operatively connected to the line and to the control signal means and responsive to the rate of passage of signals through the line for varying the characteristics of the control signal with the variations in such rate of passage and for introducing such control signal to the current control member.*

*12. In combination for use in apparatus including transducing means for reproducing signals recorded in a plurality of tracks on a medium continuously movable in a direction parallel to the tracks, means for phasing and synchronizing the reproduced signals by a variable delay in the passage of such signals to eliminate the effects of flutter in the movement of the medium and the effects of misalignment of the transducing means with respect to the tracks, including, means for providing control signals having variable characteristics, first electrical circuitry means operatively connected to the control signal means and responsive to the control signals for providing a first impedance variable with the rate of occurrence of the reproduced signals, means including a delay line operatively coupled to the first electrical circuitry means and to the transducing means and responsive to the reproduced signals to provide a delay of the reproduced signals variable with variations in the rate of repetition of the reproduced signals and to provide a second variable impedance having characteristics corresponding to the first variable impedance provided by the first electrical circuitry means, and second electrical circuitry means responsive to the rate of passage of the signals through the delay line and operatively connected to the control signal means and to the first variable circuitry means for obtaining variations in the characteristics of the control signals to regulate the rate of passage of the reproduced signals through the delay line.*

*13. In combination for use in apparatus for reproducing signals recorded in first and second tracks on a medium continuously movable in a direction parallel to the tracks, first means including transducer means disposed relative to the first and second tracks and constructed to sense the information recorded in the different tracks and to produce from the first and second tracks first and second signals having characteristics dependent respectively upon the information sensed from the tracks, second means including electrical circuitry operatively coupled to the first means and responsive to the rate of presentation of the first signals to the transducer means from the first track to produce a control signal having characteristics variable with variations in such rate of presentation, and third means including electrical circuitry operatively coupled to the first signal means and the control signal means and responsive to the control signal and to the rate of presentation of the second signals to the transducer means from the second track to regulate the rate of passage of the second signals through the first means from the second track.*

*14. In combination for use in apparatus for reproducing signals recorded in a plurality of tracks on a medium continuously movable in a direction parallel to the tracks, first means including transducer means disposed relative to the different tracks in the plurality to produce signals having characteristics corresponding to the characteristics of the signals previously recorded in the tracks, second means including first electrical circuitry operatively coupled to the transducer means and provided with relatively slow response characteristics and responsive to the signals reproduced by the transducer means from a first one of the tracks in the plurality to produce a control signal having characteristics variable at a relatively slow rate corresponding to changes in such rate of reproduction of the signals by the transducer means, and third means including second electrical circuitry responsive to the control signals and to the rate of reproduction of the signals by the transducer means from the first track in the plurality and provided with relatively fast response characteristics and operatively coupled to the first and second means to vary the rate of the signals produced by the first means from the different tracks in the plurality with variations in the characteristics of the control signal.*

*15. In combination for use in apparatus for reproducing signals recorded in a plurality of tracks on a medium continuously movable in a direction parallel to the tracks, transducer means disposed relative to the tracks in the plurality to produce signals having characteristics corresponding to the characteristics of the signals previously recorded in the tracks, a plurality of first means each coupled to the transducer means to pass the signals produced by the transducer means from a different one of the tracks in the plurality, control means coupled to a first particular one of the first means in the plurality for producing control signals having characteristics variable with variations in the rate of passage of signals through the first particular one of the first means, second means responsive to the control signals produced by the first control means and coupled to the first particular one of the first means to produce signals having characteristics variable with variations in the characteristics of the control signal for regulating the rate of passage of signals through the first means for a compensation for flutter in the movements of the continuous medium, and third means responsive to the control signals produced by the first control means and to the signals passing through a second particular one of the first means and operatively coupled to the control means and to the second particular one of the first means to produce signals for regulating the rate of passage of signals through the second particular one of the first means for a compensation for skew in the movements of the continuous medium.*

*16. In combination for use in apparatus for reproducing signals recorded in a plurality of tracks on a medium continuously movable in a direction parallel to the tracks, transducer means disposed relative to the different tracks in the plurality to produce first signals having characteristics corresponding to the information provided a successive positions in each track, first electrical circuitry means including variable impedance means coupled to the transducer means for varying the phase of the first signals produced by the transducer means with variations in the impedance of the variable impedance means, second electrical circuitry means including control means coupled to the variable impedance means for providing a control signal having characteristics variable with variations in the impedance of the variable impedance means, and third electrical circuitry means responsive to the control signal and coupled to the variable impedance means and the second electrical circuitry means for varying the impedance of the variable impedance means with variations in the characteristics of the control signal to obtain the passage of the first signals by the first electrical circuitry in a particular phase relationship.*

*17. In combination for use in apparatus for reproducing signals recorded in a plurality of tracks on a medium continuously movable in a direction parallel to the tracks means disposed relative to one of the tracks to produce first signals having characteristics corresponding to the characteristics of the signals previously recorded in the channel, a delay line having characteristics variable with variations in the characteristics of a signal introduced to the delay line, means including the delay line coupled to the signal producing means for providing a delay in the first signals produced by the signal means, control means*

*oupled to the delay line for producing a control signal aving characteristics variable with variations in the delay nparted to the signals by the delay line, and means oupled to the delay line and the control means for varyig the characteristics of the delay line with variations in ie characteristics of the control signal produced by the ontrol means to obtain the presentation by the delay line t a particular rate of the first signals produced by the gnal means.*

*18. In combination for use in apparatus for reproducig signals recorded in a plurality of tracks on a continuusly movable medium, transducer means disposed relave to the different tracks in the plurality and constructed sense the information recorded in the different tracks nd to produced signals having characteristics dependent pon the sensed information, first electrical circuitry means oupled to the transducer means and having a variable npedance for providing a controlled variation in the rate f presentation of the signals sensed by the transducing ieans from a first particular track in the plurality and for roviding such controlled variation with variations in the alue of the variable impedance, second electrical circuitry means coupled to the first electrical circuitry means nd including a first integrator having a relatively long me constant and responsive to the rate of presentation f the signals by the first electrical circuitry means for roducing a control signal having characteristics variable ith variations in the rate of presentation of the signals y the first electrical circuitry means, and third electrical rcuitry means coupled to the first and second electrical rcuitry means and including a second integrator having relatively short time constant and responsive to the conol signal for varying the impedance of the first electrical rcuitry means with variations in the characteristics of ie control signal.*

*19. In combination for use in apparatus for reproducig signals recorded in a plurality of tracks on a continuusly movable medium, transducer means disposed relave to the tracks and constructed to produce signals havig characteristics corresponding to the signals previously ecorded in the tracks, first electrical circuitry means oupled to the transducer means for delaying the signals roduced in the transducer means from a first particular ack in the plurality, second electrical circuitry means for roviding reference signals, third electrical circuitry means aving relatively slow response characteristics and oupled to the first and second electrical circuitry means or comparing the characteristics of the delayed signals nd the reference signals to produce a control signal havig characteristics dependent upon the results of such comparison, fourth electrical circuitry means responsive to the control signal and coupled to the second and third electrical circuitry means for varying the characteristics of the reference signals with variations in the characteristics of the control signal, and fifth electrical circuitry means responsive to the delayed signals and the reference signals and coupled to the first and second electrical circuitry means and having relatively fast response characteristics for varying the delay characteristics of the first electrical circuitry means with variations in the characteristics of the reference signals to regulate the rate of passage of the signals through the first electrical circuitry means.*

*20. In combination for use in apparatus for reproducing signals recorded on a moving medium, a delay line including a plurality of members having first impedances variable with the voltages applied to the members and providing delays in the passage of signals with variations in the values of the impedances, a source of voltage connected to the delay line to energize the delay line, a second variable impedance connected in a circuit with the delay line and the voltage source to vary the potential applied by the source to the delay line with variations in the value of the second variable impedance for obtaining a match between the value of the second variable impedance and the impedance of the line, transducing means disposed relative to the medium and coupled electrically to the delay line for a passage of the signals recorded on the medium through the delay line with a variable delay, and means coupled to the delay line and response to the signals through the delay line for varying the value of the second variable impedance with variations in particular characteristics of the signals.*

References Cited by the Examiner

The following references, cited by the Examiner, are of record in the patented file of this patent or the original patent.

UNITED STATES PATENTS

| | | | |
|---|---|---|---|
| 2,758,284 | 8/56 | Peoples | 333—31 |
| 2,781,495 | 2/57 | Frederick | 333—31 |
| 2,892,022 | 6/59 | Houghton | 340—174 X |
| 3,019,291 | 1/62 | Houghton | 178—6.6 |

OTHER REFERENCES

Pages 299–309, Feb. 15, 1954, Proceedings of the National Electronics Conference, vol. IX.

IRVING L. SRAGOW, *Primary Examiner.*

EVERETT R. REYNOLDS, STEPHEN W. CAPELLI, JOHN F. BURNS, *Examiners.*